United States Patent [19]

Bowe et al.

[11] Patent Number: 4,693,822
[45] Date of Patent: Sep. 15, 1987

[54] FLUIDIC CONTACTORS

[75] Inventors: Michael J. Bowe, Newton-with-Scales; Samuel N. Oruh, Lytham St. Annes; Jaswant Singh, Forton, all of England

[73] Assignee: United Kingdom Atomic Energy Authority, London, England

[21] Appl. No.: 703,355

[22] Filed: Feb. 20, 1985

[30] Foreign Application Priority Data

Feb. 23, 1984 [GB] United Kingdom ............... 8404749

[51] Int. Cl.⁴ ............................................. B01D 17/00
[52] U.S. Cl. ................................. 210/255; 210/512.1; 137/834; 366/165
[58] Field of Search ............ 210/787, 788, 789, 512.1, 210/512.2, 255, 294, 322, 418; 137/808, 810, 811, 812, 834; 366/165

[56] References Cited

U.S. PATENT DOCUMENTS

| 2,754,968 | 7/1956 | Vegter et al. | 210/512.2 |
| 2,794,832 | 6/1957 | Rietema | 210/512.2 |
| 2,965,522 | 12/1960 | Craspin et al. | 210/512.2 |
| 3,261,593 | 7/1966 | Sharples | 366/165 |
| 3,366,247 | 1/1968 | Visman | 210/512.2 |
| 3,530,725 | 9/1970 | Schmidlin et al. | 137/808 |
| 3,643,675 | 2/1972 | Wetterstad | 137/810 |
| 4,123,364 | 10/1978 | Mozley | 210/512.2 |
| 4,271,010 | 6/1981 | Guarascio | 210/512.2 |
| 4,276,943 | 7/1981 | Holmes | 137/810 |
| 4,473,478 | 9/1984 | Chivrall | 210/512.2 |

FOREIGN PATENT DOCUMENTS 95382 11/1983 European Pat. Off. .

Primary Examiner—Richard V. Fisher
Assistant Examiner—Wanda L. Millard
Attorney, Agent, or Firm—King & Schickli

[57] ABSTRACT

A fluidic contactor comprising a vortex stage and a separator stage. The vortex stage is in the form of a vortex chamber whereby fluids of different densities when introduced into the chamber through one or more tangential inlets are caused to swirl through the chamber before passing into the separator stage which is in the form of a column forming an extension of an axial outlet from the vortex chamber. In passing along the column the fluids become separated and emerge through separated outlets at the end of the column remote from the chamber. The fluids can be mixed together before entry into the chamber or separate fluids can be intimately mixed together in swirling through the chamber, in each case to permit mass transfer of constituents between the fluids.

7 Claims, 5 Drawing Figures

FLUIDIC CONTACTORS

The present invention concerns fluidic contactors.

BACKGROUND OF THE INVENTION

In the solvent extraction process a liquid to be treated is thoroughly mixed with an appropriate other liquid to achieve mass transfer of constituents from the liquid being treated to the other liquid; this being followed by the physical separation of the two immiscible liquids. Apparatus for mixing and then separating the two liquids is termed a contactor and existing forms of known contactors include packed columns, which can be pulsed, mixer-settlers, and centrifugal contactors.

Centrifugal contactors are efficient but are mechanically complex. Consequently they are expensive to manufacture and to maintain in operation. The aim of the present invention is to provide a fluidic contactor which functions in a manner analogous to that of the centrifugal contactor and which avoids the disadvantages associated with the centrifugal contactor.

FEATURES AND ASPECTS OF THE INVENTION

According to the present invention a fluidic contactor includes a vortex stage and a separator stage, in which the vortex stage comprising a vortex chamber having at least one tangential inlet and an axial outlet, the separator stage comprising a column forming an extension of the outlet and having at or adjacent its end remote from the vortex chamber spaced apart openings whereby fluids of different densities introduced into the chamber through the inlet or inlets swirl through the chamber and the swirling flow from the chamber in passing along the column results in centrifugal separation of the fluids with the separated fluids emerging from the column through the spaced apart openings.

Preferably the chamber and the column form a unit and a plurality of units can be joined together to form a cascade.

DESCRIPTION OF THE DRAWINGS

The invention will be described further, by way of example, with reference to the accompanying diagrammatic drawings; in which.

DESCRIPTION OF THE PREFERRED EMBODIMENTS

Figure 2:
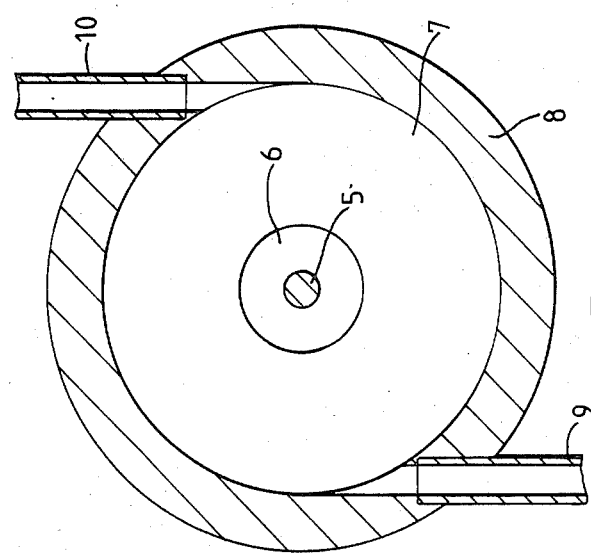
FIG. 2 is a section on A—A in FIG. 1.

A fluidic contactor depicted in the drawings is formed as a unit from a three-part housing, namely, a base member 1, a tubular member 2 having a flange 3 to seat on the base member 1 and a closure member 4 carried on the tubular member 2. The inner wall of the tubular member 2 can be parallel or inclined to its axis. The members can be bolted or otherwise secured together into an integral assembly.

A central, upright stem 5, which can be conical or cylindrical in section is located on the base member 1 and extends axially for the full or partial length of the tubular member 2 to form an annular column 6 within the tubular member. The opposing faces of the base member 1 and the flange 3 are recessed and cooperate to form a chamber 7, the vortex chamber, when the base member 1 and the flange 3 are brought into abutment at their mating outer radial surface portions 8. The axial cross section through the vortex chamber can have a suitable profile which may be other than parallel sided. Diametrically located ports 9 and 10 are provided to introduce tangential flows into the vortex chamber 7.

At its end opposite the base member 2 the closure member 4 cooperates with the end of the stem 5 and the end of the annular column 6 to form inner and outer annular exit openings 11 and 12 respectively. The opening 11 communicates with outlet passage 13. Similarly, the opening 12 communicates by way of an annular weir 14 and an annular compartment 15 formed in the body of the member 2 with an outlet passage 16.

In operation a first liquid is fed into the vortex chamber 7 through the tangential inlet port 9 and a second liquid is fed into the chamber 7 through the tangential inlet port 10. For example, the liquid introduced at the port 10 can be an organic solvent such as tributyl phosphate in odourless kerosene as used in the reprocessing of nuclear fuel and the liquid introduced at the port 9 can be an aqueous phase comprising nuclear fuel dissolved in nitric acid. Due to the tangential inlets swirling of the two liquids occurs in the chamber 7 to effect thorough mixing whereby mass transfer of constituents can take place between the liquids. The swirling flow passes from the chamber 7 to spiral up the annular column 6. Due to centrepetal acceleration and the difference in density between the two liquids, on rising up the column, the lighter liquid moves towards the stem 5 and the heavier liquid moves towards the wall of the column 6.

In the aforementioned example the solvent, being the lighter liquid, emerges at the top of the column through the annular opening 11 and the outlet passage 13. The heavier aqueous liquid emerges through the annular opening 12 and passage 16.

Although the vortex chamber 7 is shown having two tangential inlets it will be realised that the number of inlets is a matter of choice. For example, in situations where the liquids are in admixture prior to entry into the chamber it is possible to utilise a chamber having a single tangential inlet.

Figure 1:
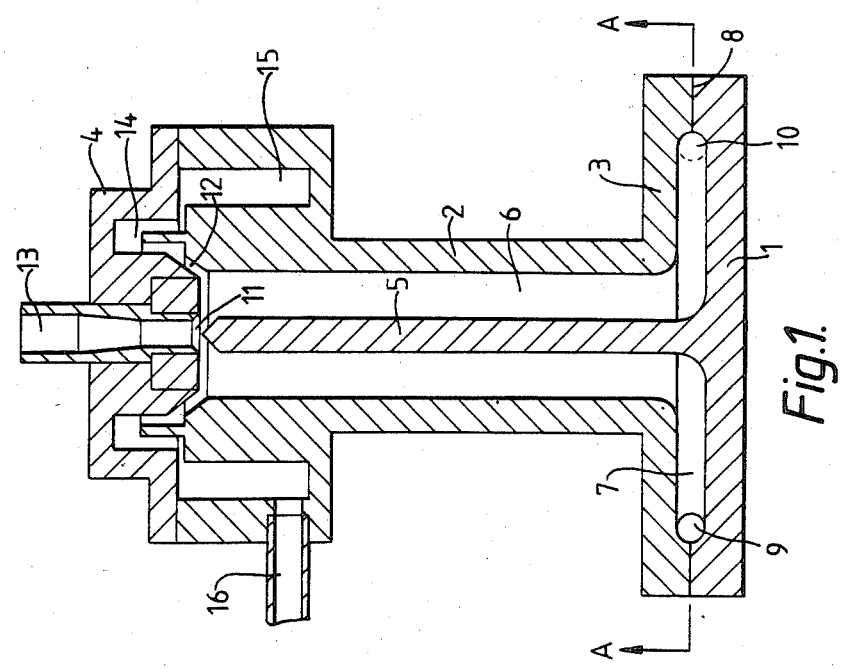
FIG. 1 is a diagrammatic longitudinal sectional elevation of an embodiment of a fluidic contactor.
Figure 3:
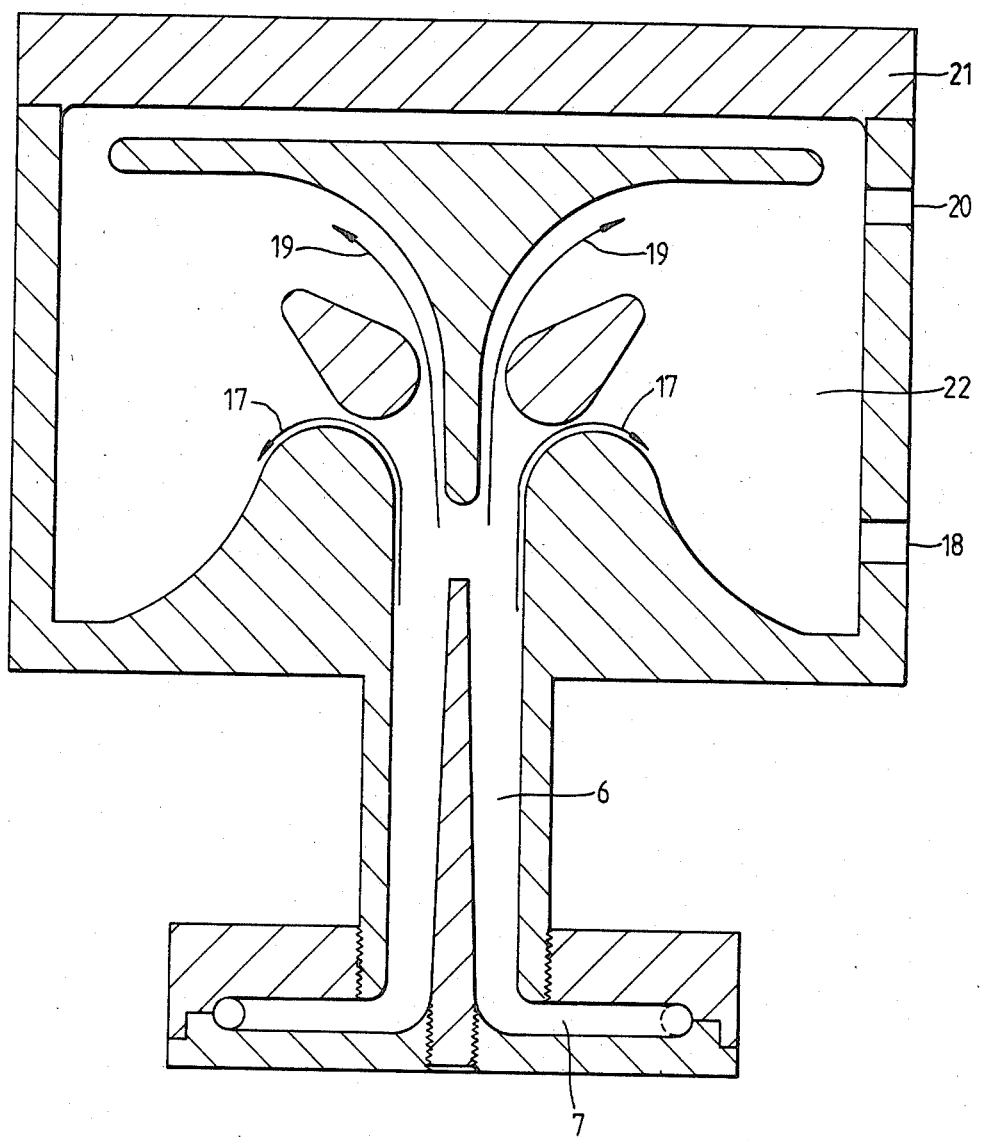
FIG. 3 is a diagrammatic longitudinal sectional elevation of an alternative embodiment of a fluidic contactor.

An alternative embodiment of a contactor is shown in FIG. 3. As in the embodiment of FIG. 1, the contactor comprises a vortex chamber 7 and an annular column 6. However, the geometrical profiles at the upper end of the column have been altered whereby to avoid sharp edges and abrupt changes in flow paths. In FIG. 3 the profiles are such as to encourage stream-line flows.

As before, the swirling flow from the chamber 7 spirals up the column 6 and the lighter or less dense phase moves towards the centre of the column and the heavier phase moves towards the wall of the column. The heavier phase tends to follow a path indicated by the arrows 17 to collect at the bottom of chamber from which it can be discharged through outlet 18. The lighter phase tends to follow a path indicated by the arrows 19 and flows smoothly into the upper regions of the chamber from which it can be discharged through outlet 20. Alternatively, the outlet 20 can be positioned in the upper closure member 21. It will be appreciated that in use the contactor is completely filled and that an interface between the phases forms in compartment 22.

The liquids can be introduced into the chamber by means of a known fluidic pump system. Such a pump system does not include moving parts and is particularly advantageous when pumping toxic and hazardous liquids.

A plurality of contactors can be connected to provide a cross flow or counter flow cascade and the operating principles are equally applicable to any combination of gaseous and liquid inlet flows. A single contactor or a plurality of contactors can be orientated in any suitable plane.

The mass transfer of constituents between the fluids followed by the physical separation of the fluids will be determined by the degree of mixing and the residence time in the contactor. To obtain effective mass transfer it is possible to employ a cascade of individual contactors which can be connected together, for example, in a cross-current or a counter-current mode.

Figure 4:
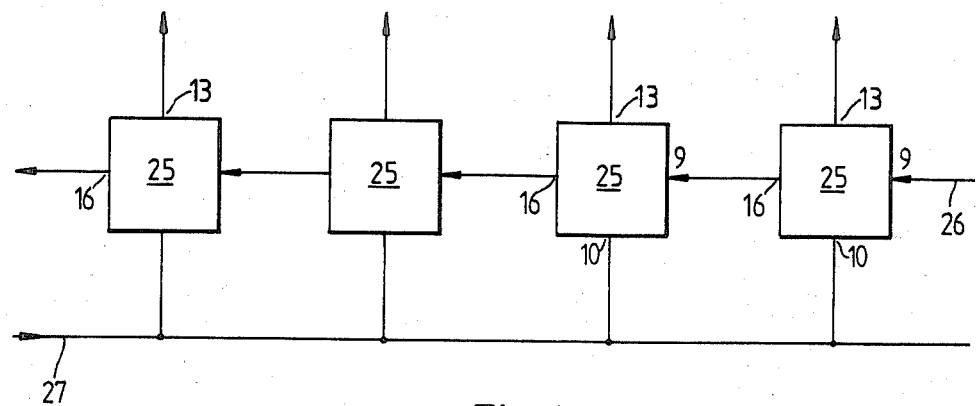
FIG. 4 is a schematic arrangement of a plurality of fluidic contactors arranged for cross-current operation.

FIG. 4 depicts schematically a cascade of contactors 25 arranged for cross-current operation. For a better understanding of the manner of the connections between the individual contactors the inlets and outlets thereof are indicated by the reference numerals employed in FIG. 1. Thus a first fluid driven by a first fluidic pump in flow line 26 flows through inlet 9 into the first contactor of the cascade and a second fluid driven along flow line 27 by a second fluidic pump flows through inlet 10 into the first contactor. As example only and with reference to the reprocessing of nuclear fuel, the first fluid can be an aqueous phase comprising nuclear fuel dissolved in nitric acid and the second fluid can be an organic solvent such as tributyl phosphate in odourless kerosene. It will be seen from FIG. 4 that fresh solvent is fed into each individual contactor as the aqueous phase flows through the contactors.

Figure 5:
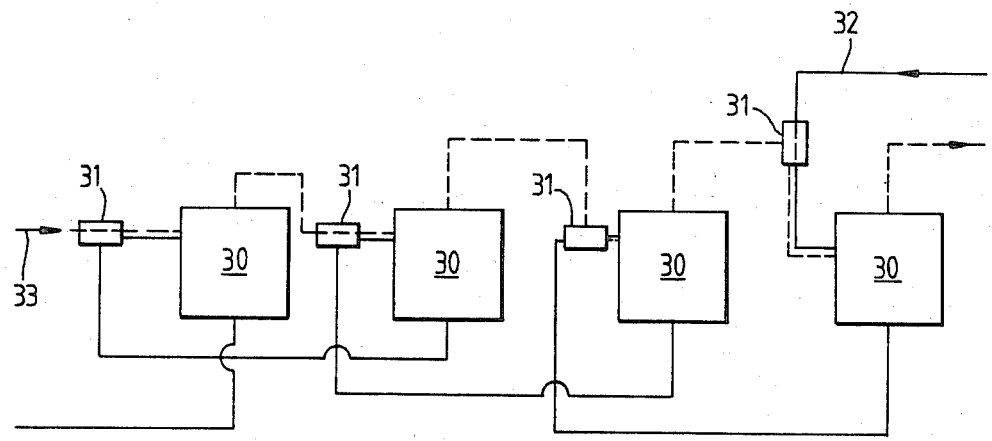
FIG. 5 is a schematic arrangement of a plurality of fluidic contactors arranged for counter-current operation.

Alternatively, and as shown in FIG. 5, contactors 30 can be arranged for counter-current operation. In this arrangement the aqueous phase flow is denoted by the full line and the solvent phase flow is denoted by the dotted line. The phases are again driven by fluidic pumps and in order to create favourable driving pressures across the cascade it is desirable to provide interstage pumping. Such interstage pumping can conveniently be provided by jet pumps 31.

A jet pump is a three terminal device in which an inlet flow at a first terminal passes through a nozzle or jet to enter a co-axial diffuser section spaced from the nozzle or jet and forming a second terminal of the device. A third terminal communicates with the interspace between the nozzle and diffuser with the result that flow therefrom is entrained in the flow from the nozzle to the diffuser. Thus, with reference to FIG. 5, aqueous flow pumped along line 32 is connected to the first terminal of the jet pump to entrain solvent flow emerging from the preceding contactor in the cascade. In this arrangement each contactor is provided with a single inlet which receives the outflow from the respective jet pump. At the opposite end of the cascade the reverse occurs in that the solvent flow pumped along line 33 is connected to the first terminal of the associated jet pump to entrain aqueous flow from the next following contactor in the cascade. It will be realised that the number of individual contactors in the cascades can be chosen to suit working requirements and is not limited to four as shown in the drawings.

We claim:

1. A fluidic contactor including a vortex stage and a separator stage, the vortex stage comprising a closed vortex chamber having at least one tangential inlet and an axial outlet, the separator stage including a column forming an extension of said outlet and spaced apart openings at the end of the column remote from the vortex chamber whereby fluids of different densities when introduced into the chamber through said at least one tangential inlet are caused to swirl through the chamber to achieve intimate mixing thereof and substantially the entire resulting mixed flow emerging from the chamber through the axial outlet spirals along the column to cause density separation of the fluids, the separated fluids emerging through said spaced apart openings at said end of the column.

2. A fluidic contactor according to claim 1 in which the vortex chamber and the column form a unit.

3. A fluidic contactor according to claim 2 in which the column is annular in transverse section.

4. A fluidic contactor according to claim 1 including surfaces defining stream-line flow paths for fluids emerging from the column.

5. A fluidic contactor according to claim 2 comprising a plurality of units arranged in a cascade.

6. A fluidic contactor according to claim 5 in which the units are arranged in a cross-current mode.

7. A fluidic contactor according to claim 5 in which the units are arranged in a counter-current mode.

* * * * *